Aug. 14, 1962　　K. A. KESSELRING　　3,049,483
NEUTRONIC REACTORS AND CONTROL MEANS THEREFOR
Filed March 28, 1952　　3 Sheets-Sheet 1
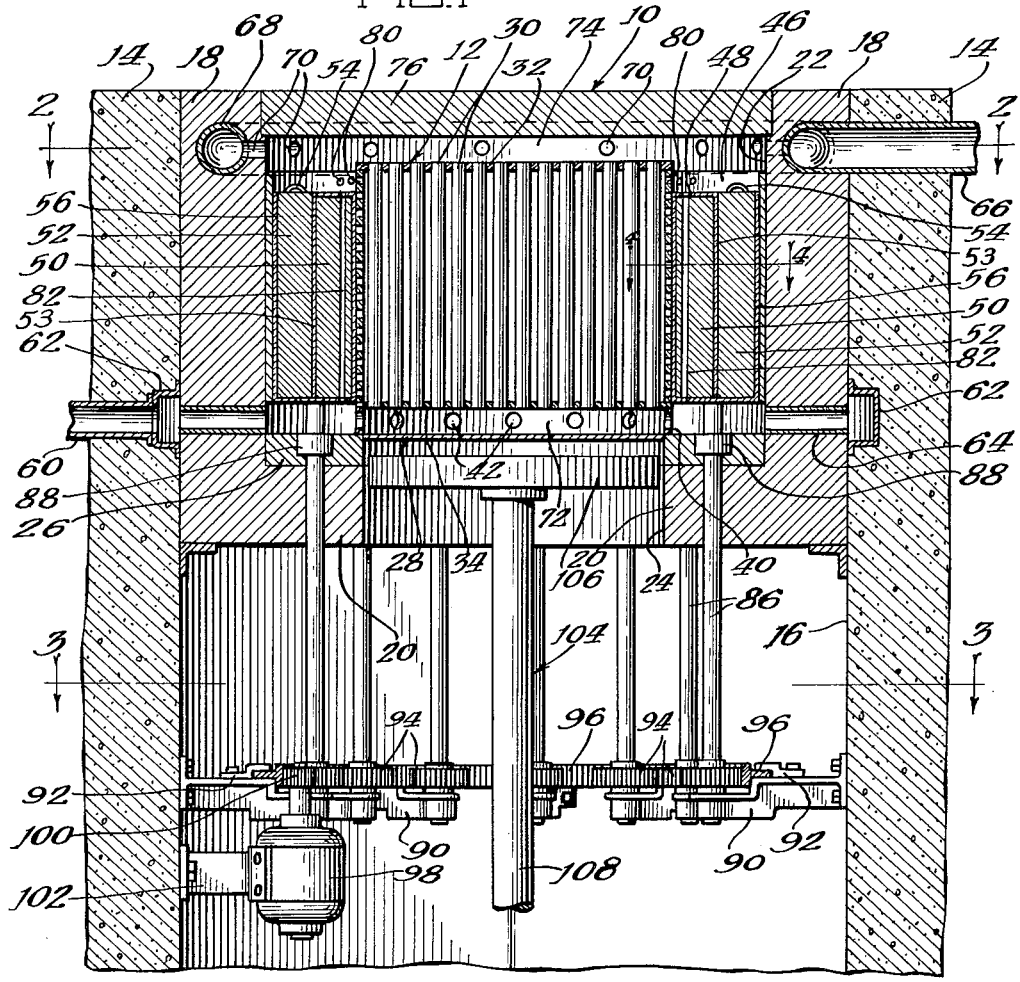
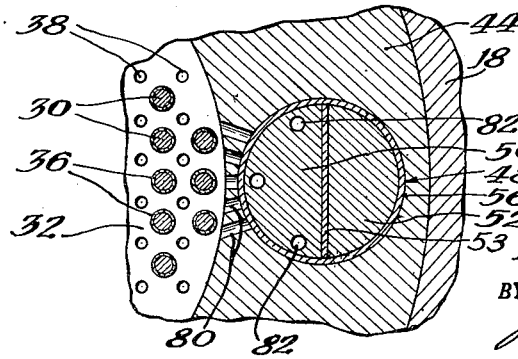
INVENTOR.
Kenneth A. Kesselring
BY
Roland A. Anderson
Attorney

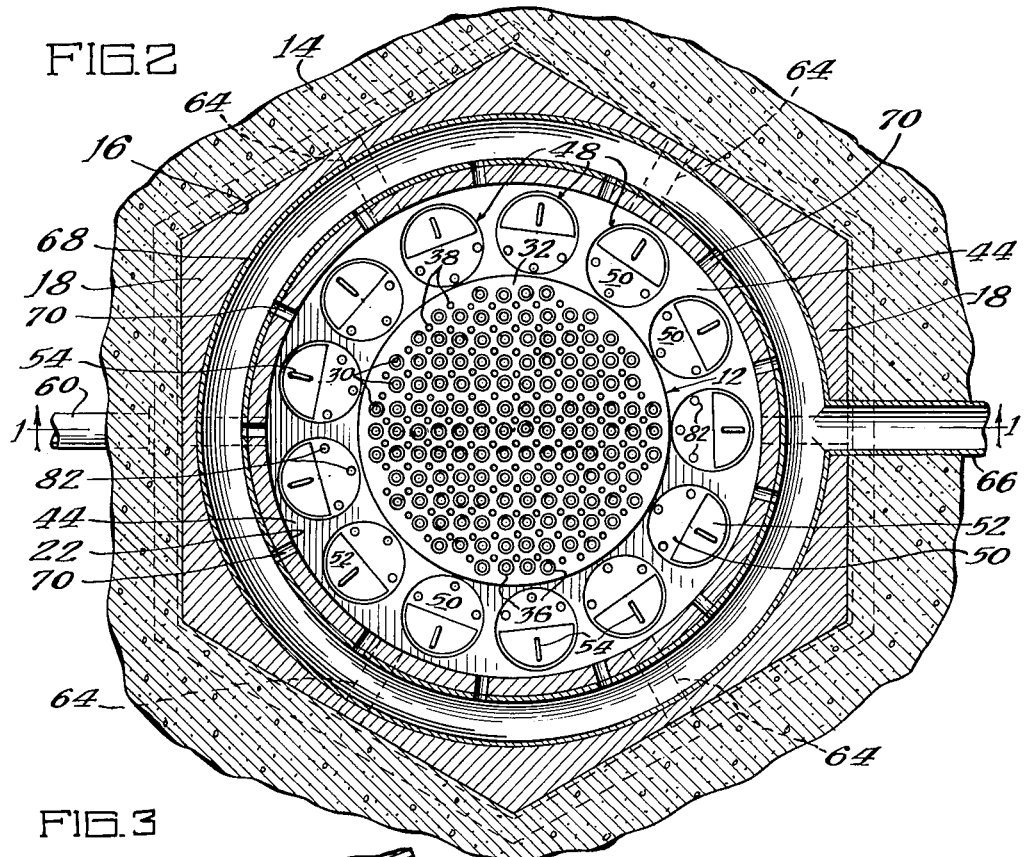
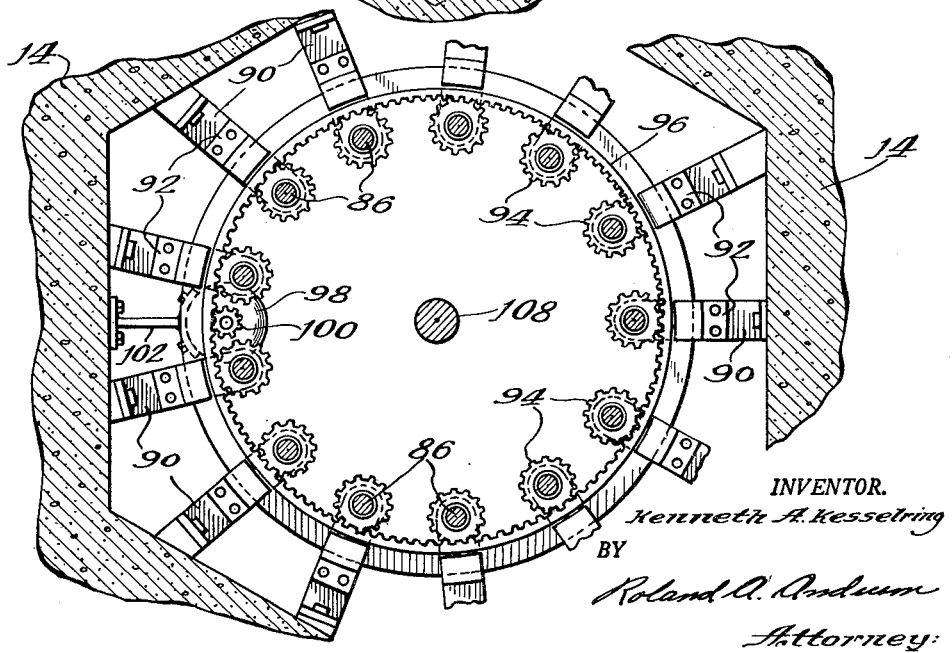

Aug. 14, 1962 K. A. KESSELRING 3,049,483
NEUTRONIC REACTORS AND CONTROL MEANS THEREFOR
Filed March 28, 1952 3 Sheets-Sheet 3
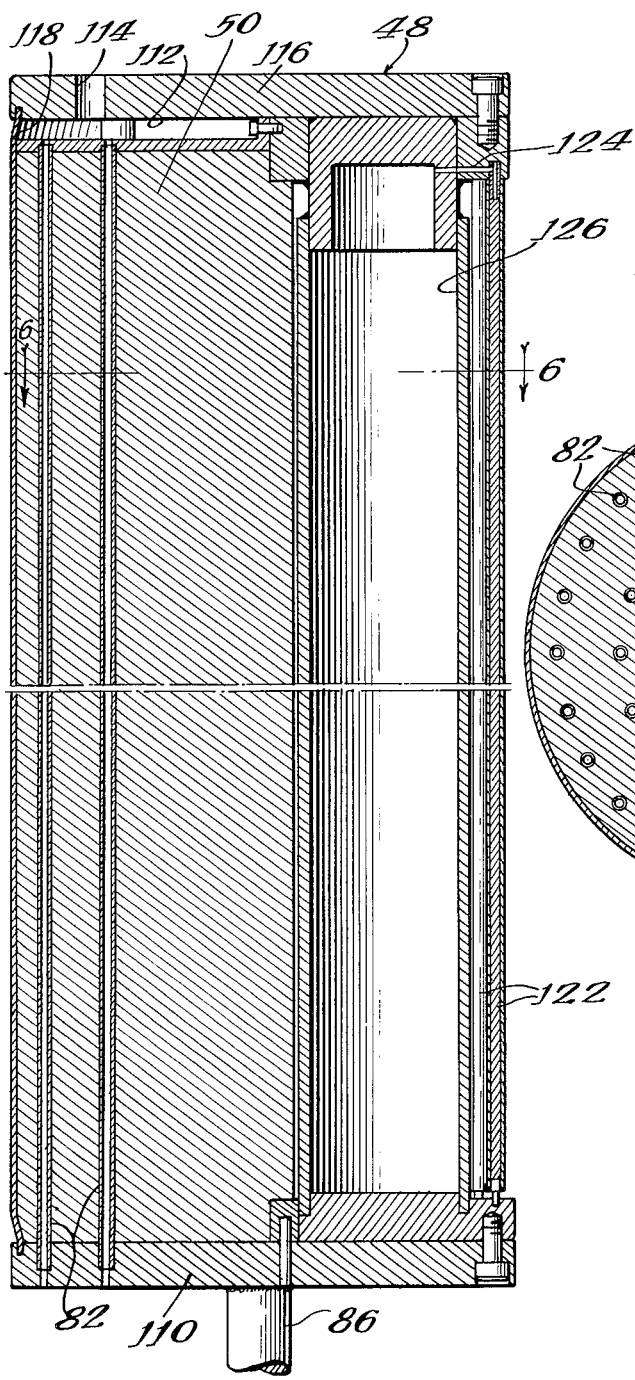
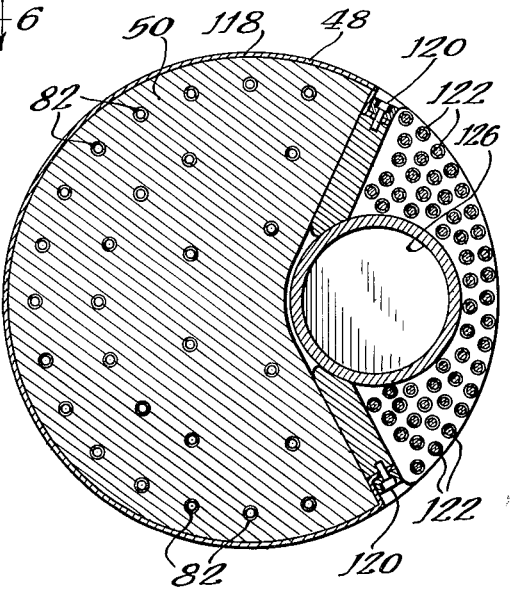
INVENTOR.
Kenneth A. Kesselring
BY
Roland A. Anderson
Attorney:

> United States Patent Office 3,049,483
Patented Aug. 14, 1962

3,049,483
NEUTRONIC REACTORS AND CONTROL
MEANS THEREFOR
Kenneth A. Kesselring, Schenectady, N.Y., assignor to the United States of America as represented by the United States Atomic Energy Commission
Filed Mar. 28, 1952, Ser. No. 279,004
9 Claims. (Cl. 204—193.2)

This invention relates broadly to neutronic reactors. More particularly it pertains to controls for a neutronic reactor.

For an understanding of the theory of a reactor, reference is made to the copending application of Leo Szilard, Serial No. 698,334, filed September 20, 1946, and Patent No. 2,708,656, issued to Fermi and Sziiard, May 17, 1955. In addition, reference is made to the copending application of Lewi Tonks, Serial No. 278,996, filed March 28, 1952.

An object of this invention is to provide control means for a reactor, especially one of the intermediate neutron energy type.

Still a further object is to provide such a reactor.

Another object is to provide a control means having improved breeding characteristics.

The scheme of the present invention for the control of a neutronic reactor contemplates thirteen composite bodies or cylinders disposed within the reflector blanket surrounding the active portion or reactor core. Each body is rotatable about its longitudinal axis by means of an electric motor. One side of each body is composed of a neutron reflector material preferably material of atomic weight below 30 and having a neutron absorption cross section of below $10^{-24}$ square centimeters, such as beryllium, graphite, and the other side includes a neutron absorber material having an absorption cross section of substantially greater than $10^{-24}$ square centimeters, such as thorium ($Th^{232}$) or uranium ($U^{238}$) for breeding purposes or a poison material to be discussed below. When the reactor is operated at optimum output the reflector side of all the cylinders are turned to face the inner periphery of the reflector core. On the other hand, when the reactor is to be operated at reduced output, the bodies are rotated so as to present the neutron absorber material to the reactor core. The bodies are rotated simultaneously. With a slight rotation of a master ring gear attached to the electric motor, all of the control bodies rotate. In this manner a full 180° rotation of the bodies may cut the effectiveness of the reflector more than enough to achieve 100 percent control.

For a more complete understanding of this invention, reference is made to the drawings in which:

FIGURE 1 is a vertical sectional view, partly in elevation, showing one embodiment of the reactor;

FIGURE 2 is a horizontal sectional view, partly in plan, taken on the line 2—2 of FIGURE 1;

FIGURE 3 is a horizontal sectional view, partly in plan, taken on the line 3—3 of FIGURE 1;

FIGURE 4 is an enlarged fragmentary sectional view showing one embodiment of the control body disposed within the reflector blanket taken on the line 4—4 of FIGURE 1;

FIGURE 5 is an enlarged vertical sectional view, showing a second embodiment of the control body; and FIGURE 6 is a horizontal sectional view taken on the line 6—6 of FIGURE 5.

As shown in FIGURE 1, a neutronic reactor is generally indicated at 10 and includes an active portion or core 12 at the center thereof. Surrounding the exterior of the reactor 10 is a supporting shield 14 which is composed of a neutron absorbing material, such as concrete. The shield 14 has a hexagonal bore 16 (FIGURE 2) in which is disposed the reactor 10 together with its operating parts. The upper portion of the bore 16 contains an iron shield 18, the exterior of which is hexagonal in order to fit the bore. The purpose of the shield 14 is not only to absorb escaping neutrons but also harmful radioactive products of fission, such as gamma rays. At the lower end of the shield 18 is an annular shoulder 20 which is integral therewith. The shoulder 20 reduces the diameter of a larger bore 22 of the shield 18 to a smaller bore 24. Seated on the top surface of the shoulder 20 is an annular member 26 composed of a neutron reflecting material, such as beryllium. A partition 28, which is a relatively thin circular member, is secured about its periphery to the inner periphery of the member 26 in a fluid-tight manner, such as by welding.

The core 12 is composed of a plurality of elongated fuel elements 30, extending vertically between an upper horizontal plate 32 and a lower horizontal plate 34. Each plate contains a number of apertures 36 (FIGURE 2) which are identically disposed for the purpose of sustaining the fuel elements 30 in a vertical position. As shown in FIGURE 2, a number of smaller apertures 38 are disposed in the plates 32 and 34 between the apertures 36 for the purpose of passing a coolant fluid (not shown) in a manner to be described hereinbelow. Support for the core 12, including the fuel elements 30 is provided by an annular ring 40 between the lower horizontal plate 34 at the periphery thereof and the annular member 26. A number of apertures 42 are placed in the ring 40 to permit the passage of a coolant fluid.

Surrounding the core 12 is a neutron reflector blanket 44 which is composed of material of low atomic weight, such as beryllium. The blanket 44 is annular and adapted to fit the large bore 22 of the shield 18, as shown in FIGURE 2. The primary purpose of the blanket 44 is to reflect neutrons, emanating from the fuel elements 30 as a result of the fission process, back to said elements to produce more fissions. For this purpose alone a solid annular blanket would be sufficient. However, it is necessary in order to control the reactor and its level of fissioning to modify the blanket 44. In this particular reactor 10 a plurality of vertical bores 46 are spaced within the blanket 44 for the purpose of containing a control body 48. For practical purposes the bores 46 are round and the control bodies 48 are cylindrical, one preferably fitting snugly in each bore, as shown in FIGURES 1, 2, and 4.

Each control body 48 is a composite of two parts, one part being a reflector portion 50 of material of an atomic weight below 30 and having a neutron absorption cross section of below $10^{-24}$ square centimeters (such as beryllium), and the other part being composed of a neutron absorber portion 52. The body 48 is separated from the portion 52 by a partition 53. It is pointed out that the control bodies 48, shown in FIGURES 1, 2, and 4 are only one embodiment thereof. A second embodiment is that shown in FIGURES 5 and 6 which is of equal radius and length with the first embodiment and which may be substituted therefor. The second embodiment will be described in detail hereinbelow. The portions 50 and 52 of the control body 48 extend vertically thereof, each occupying substantially one-half of the body. The absorber portion 52 is intended for the embodiment of the control body 48, shown in FIGURES 1, 2, and 4 to be removable for the purpose of replacement. For this purpose a handle 54 is imbedded into the top of each absorber portion 52 in order to lift said portion from the body 48 whenever necessary. By virtue of this construction it is therefore practical to use an absorber material, such as thorium, whereby breeding of fissionable material is possible. On the other hand, the reflector portion 50 is permanently encased in the body 48 within a cylindrical container 56 of a material, such as stainless steel.

A cooling system is provided in order to operate the reactor 10 at the designed temperature. The system at the lower level includes a coolant inlet 60 extending through the supporting shield 14, a coolant header 62 about the hexagonal surface of the shield 18, a plurality of radial feeders 64 extending from the header 62 to the bore 22 of the shield 18. At the upper level the coolant system includes a coolant outlet 66 extending through the shields 14 and 18, an annular header 68 within the shield 18 and a plurality of radial feeders 70 which communicate the outlet and header with the interior of the reactor. In addition, the cooling system includes a lower plenum chamber 72 and an upper plenum chamber 74. The former chamber lies between the top surfaces of the annular member 26 and the partition 28 on the one side and the lower surfaces of the reflector blanket 44 together with the control bodies 48 therein and the lower horizontal plate 34 on the other side, said chamber including that portion of space contained within the annular ring 40. At the top of the bore 22 is a removable cover 76, the lower surface of which is the top side of the upper plenum chamber 74. The lower side of said chamber is composed of the top surfaces of the reflector blanket 44, the control bodies 48, and the upper horizontal plate 32. By virtue of this construction a suitable coolant, such as liquid sodium (not shown), enters the lower plenum chamber 72 via the inlet 60, the header 62 and the radial feeders 64. From there the coolant rises into the core 12 through the apertures 38 in the plate 34 (FIGURES 2 and 4), filling the space between the fuel elements 30. Continuing to rise, the coolant moves through the apertures 38 in the plate 32 into the upper plenum chamber 74 from which it exits by means of the several radial feeders 70 and the annular header 68 that communicate with the outlet 66.

In addition to controlling the temperature of the fuel elements 30 by intimate contact therewith, the coolant also contacts the surfaces of the reflector blanket 44 including the control bodies 48. For this purpose a plurality of horizontal apertures 80 are drilled through that portion of the blanket 44 adjacent the core 12 (FIGURES 1 and 4). These apertures 80 afford passage means for the coolant from the core 12 into the various vertical bores 46 in the blanket 44 and in the interface lying between the blanket and the control bodies 48. Further the coolant is permitted to circulate through the reflector portion 50 of each body 48 via several vertical bores 82 shown in FIGURES 1 and 4. In this manner the coolant passes directly from the lower plenum chamber 72 to the upper chamber 74 through the bores 82, no matter in what position the bodies 48 are disposed.

As was mentioned above the bodies 48 are rotatable members which are rotated in phase for uniform power distribution. In FIGURE 1, rotation is accomplished by mounting each body 48 on a vertical shaft 86 which extends upwardly from the lower portion of the reactor 10 through the shoulder 20 and the annular member 26. A labyrinth bearing 88 is provided for each shaft and is imbedded in the annular member 26 in order to prevent leakage of the coolant from the lower plenum chamber 72. The lower extremities of the shafts 86 are disposed in a supporting member 90 (FIGURE 3). Near the lower end of each shaft 86 a pinion 94 is secured. The pinions 94 mesh with a continuous rotatable ring gear 96 which is horizontally disposed on the top of the supporting members 90 where it is held by a number of retainer brackets 92. The gear 96 is driven by an electric motor 98 by means of a pinion 100. As shown in FIGURES 1 and 2, the motor 98 is secured to the interior bore 16 of the supporting shield 14 by means of a bracket 102. By virtue of this construction all of the control bodies 48 are driven in phase to assure uniform distribution and presentation of the reflector and absorber portions 50 and 52 of each control body about the exterior of the core 12 when operating conditions require their rotation.

The foregoing control mechanisms are used primarily to affect slight changes in the operation of the reactor over a given period. When it is desired to reduce the temperature and therefore the output, the control bodies 48 are turned a predetermined number of degrees of rotation in order to present to the neutrons emanating from the fuel elements 30 a greater portion of neutron absorbing material, that is, the absorber portion 52 of each body, and a smaller portion of the reflector material 50. To reduce the power output of the reactor 10 to a minimum the absorber portions 52 are rotated to the position immediately adjacent the core 12. In addition an emergency mechanism is provided which may be used if necessary to minimize the reactor output. This mechanism is a safety piston, generally indicated at 104, which consists of a cylindrical body 106 surmounting a vertical shaft 108. During usual operating conditions the cylindrical body 106 is disposed within the smaller bore 24 of the iron shield 18 below the partition 28 as shown in FIGURE 1. Since the cylindrical body 106 serves as a neutron reflecting member under usual operating conditions, it is composed of a neutron reflecting material of low atomic weight, such as beryllium. The supporting shaft 108 is held in position pneumatically against a spring (not shown) in a manner well-known in the art. In an emergency, the pneumatic pressure may be eliminated to permit the spring to drive the piston away from the reactor 10 with an acceleration of approximately 5 G. The time element in this operation is extremely short and can be of the order of a .01 second depending upon the rapidity with which the need for actuation is required and transmitted. The distance through which the safety piston 104 must move is a few inches.

The second embodiment of the control body 48 is that shown in FIGURES 5 and 6. Although the exterior dimensions of the second embodiment are necessarily identical with those of the first embodiment (heretofore described in FIGURES 1 and 4) when used in the reactor of FIGURE 1, the interior construction and theory of operation are different in several respects. The primary difference between the two embodiments is the elimination of the absorber portion 52 of the first embodiment, and the substitution therefor of a so-called poison material. The second embodiment, however, does retain the reflector portion 50 of the first embodiment and consists of a block of neutron reflector material of low atomic weight, such as beryllium, having a portion greater than half of the circular cross section (FIGURE 6) of the control body 48. As in the first embodiment, the reflector portion 50 is cooled by a plurality of vertical bores 82 extending from a lower end plate 110, where the coolant enters, to the upper end of said portion. Here the bores 82 communicate with a chamber 112 which in turn communicates with the top surface of the body 48 by means of a passage 114 in a top cover plate 116. In addition, the reflector portion 50 is enclosed within a protective jacket 118 which is securely placed on either side by means of bolts 120 (FIGURE 6) and which is secured at the upper and lower ends (FIGURE 5) within the top cover plate 116 and the lower end plate 110, respectively.

As shown in FIGURE 6 the portion of the cross section of the control body 48, not included by the reflector portion 50, is devoted to a plurality of poison tubes 122. These tubes, extending vertically from the lower to the upper end of the body 48, are grouped together on one side of the body so that they may be presented in a position adjacent the core 12 of the reactor 10 in a manner similar to that already described for the absorber portion 52 of the first embodiment. The tubes are filled with a material which absorbs neutrons, but which, unlike the replaceable breeder-absorber portions 52 of the first embodiment, lack the attribute of breeding fissionable neutron material. Accordingly, the tubes are filled with a neutron absorbing material, such as boron carbide, gadolinium, or samarium, which are so-called poison materials.

Due to the fact that boron carbide generates helium gas when it absorbs neutrons, the poison tubes 122 are provided with a gas passage 124 at the top extremities thereof which communicate with a gas storage cylinder 126. It is evident that by this construction as the helium gas is generated it may pass out of the poison tubes 122 into the storage chamber 126 where the detrimental effect of its pressure is minimized. On the other hand, where the elements gadolinium or samarium are used in place of boron carbide, the system is completely free of gases or injurious products of neutron absorption. Therefore, where the latter elements are used, it is possible to modify the second embodiment of the control body 48, whereby the gas storage clyinder 126 may be eliminated. Finally, as in the case of the first embodiment, the second embodiment is mounted on a rotatable shaft 86 as shown in FIGURE 5.

An alternative arrangement for the control bodies 48 is possible where the cross section of the core is other than round. For example, if the cross section is hexagonal, one body 48 may be located at each corner in the reflector region, rather than contiguously as shown in FIGURE 2.

Salient features of an operable intermediate pile power plant are set forth below without intending to limit this invention thereby. The fuel will consist of $U^{235}$-Be alloy rods encased in pure beryllium jackets. The atomic ratio of beryllium to $U^{235}$, for example, is about 150:1. Beryllium serves as the moderator and is included in the fuel alloy as well as in the jacket and reflector surrounding the core. As an initial charge approximately 30 kg. of 100% $U^{235}$ is used in a particular design to maintain a chain reaction for six months without refueling. A correspondingly larger mass of fuel is required for any $U^{235}$ enrichment of uranium to provide less than 100% $U^{235}$. The dimensions of a cylindrical core in this design are about 25 inches in both diameter and length. The reflector is about 10 centimeters thick and contains, e.g., beryllium, and a biological shield, such as concrete, as shown in the drawings, or of alternate layers of iron and Masonite. A circulating system of molten sodium will act as a primary heat exchanger fluid. The over-all weight of the reactor including the shield is approximately 500 long tons.

The teachings of this invention shall not be deemed to be limited to the embodiments illustrated in the drawings and the above description. Many equivalent devices employing the teachings will readily be devised by persons skilled in the art. Accordingly, the present invention shall be deemed to be limited only to the appended claims.

What is claimed is:

1. A neutronic reactor comprising an active portion having cylindrical shape, an annular body of neutron reflector material surrounding said portion and having a plurality of equally disposed apertures in the body extending parallel to the axis thereof, a cylindrical body in each aperture, each body having a substantially semicylindrical portion of neutron reflector material and also having a substantially semicylindrical portion of neutron absorber material, and means for rotating said bodies so as to present similar portions in adjacent and remote positions with respect to the active portion.

2. A neutronic reactor comprising an active portion having cylindrical shape, a fixed nuclear reflector about a periphery of the active portion, said reflector having a plurality of apertures equally disposed therein and parallel to the longitudinal axis of the active portion, a cylindrical body within each aperture adapted to rotate about their longitudinal axes, said body having a parallel neutron reflector portion and also having a neutron absorber portion, and means for rotating said bodies so as to present similar cylindrical portions in adjacent and remote positions with respect to the active portion.

3. A neutronic reactor comprising an active portion having cylindrical shape, a neutron reflector surrounding the active portion, a plurality of cylindrical bodies equally disposed within the reflector adapted to be rotated about their longitudinal axes parallel to that of the active portion, each body having substantially a semicylinder of beryllium, each body also having substantially a semicylinder of neutron absorber material, and means for rotating said bodies so as to present the beryllium in adjacent and remote positions with respect to the active portion.

4. A neutronic reactor comprising an active portion having cylindrical shape, a neutron reflector surrounding the active portion, a plurality of cylindrical bodies equally disposed within the reflector adapted to be rotated about their longitudinal axes parallel to that of the active portion, each body having a substantial portion composed of neutron reflector, each body also having a portion composed of boron carbide, and means for rotating said bodies so as to present the boron carbide in adjacent and remote positions with respect to the active portion.

5. A neutronic reactor comprising an active portion having cylindrical shape, a neutron reflector surrounding the active portion, a plurality of cylindrical bodies equally disposed within the reflector adapted to be rotated about their longitudinal axes parallel to that of the active portion, each body being substantially occupied by beryllium, each body also having a portion occupied by boron carbide, and means for rotating said bodies so as to present the beryllium in adjacent and remote positions with respect to the active portion.

6. A neutronic reactor comprising an active portion having cylindrical shape, a neutron reflector surrounding the active portion, a plurality of cylindrical bodies equally disposed within the reflector adapted to be rotated about their longitudinal axes parallel to that of the active portion, each body being substantially occupied by beryllium, each body also having a portion composed of gadolinium, and means for rotating said bodies so as to present the beryllium in adjacent and remote positions with respect to the active portion.

7. A neutronic reactor comprising an active portion having cylindrical shape, a neutron reflector surrounding the active portion, a plurality of cylindrical bodies equally disposed within the reflector adapted to be rotated about their longitudinal axes parallel to that of the active portion, each body being substantially occupied by beryllium, each body also having a portion composed of samarium, and means for rotating said bodies so as to present the beryllium in adjacent and remote positions with respect to the active portion.

8. In a neutronic reactor having an active portion, a control means comprising a plurality of contiguous cylinders encircling the active portion of the reactor, each cylinder having a quantity of neutron reflector material and a quantity of neutron absorber material oppositely disposed therefrom, said materials extending longitudinally of the cylinder, and means for rotating simultaneously the cylinders approximately 180° about their longitudinal axes, whereby the sides of the cylinders having similar material may be rotated into a position adjacent the active portion.

9. A device comprising a cylinder having a quantity of beryllium disposed longitudinally in a first segment of the cylinder, a plurality of tubes each filled with boron carbide disposed longitudinally in a second segment of the cylinder, a gas collection tube disposed longitudinally in the second segment of the cylinder between said tubes filled with boron carbide and said quantity of beryllium, means for cooling said quantity of beryllium comprising a plurality of tubes disposed longitudinally through the quantity of beryllium, and means for supplying a coolant fluid to said plurality of tubes, and means providing communication between the top extremities of the tubes filled with boron carbide and the gas collection tube.

References Cited in the file of this patent

UNITED STATES PATENTS

| | | |
|---|---|---|
| 457,606 | Norcross | Aug. 11, 1891 |
| 895,164 | Cowper-Coles | Aug. 4, 1908 |
| 2,305,555 | Peters et al. | Dec. 15, 1942 |
| 2,434,392 | Chace | Jan. 13, 1948 |

FOREIGN PATENTS

| | | |
|---|---|---|
| 233,011 | Switzerland | Oct. 2, 1944 |
| 614,386 | Great Britain | Dec. 15, 1948 |

OTHER REFERENCES

Physical Review, August 1, 1935, vol. 48, pages 265, 277.

Smyth, H. D.: A General Account of the Development of Methods of Using Atomic Energy for Military Purposes, pub. by Supt. of Documents, Washington, D.C., August 1945, pages 21–25.

The Science and Engineering of Nuclear Power, by Clark Goodman, 1947, Addison-Wesley Press, Cambridge, Mass., pages 275, 296–320.

Harwell, The British Atomic Energy Research Establishment, 1946–1951, London, 1952, pages 38–42.